(12) United States Patent
Hayashi

(10) Patent No.: US 8,794,277 B2
(45) Date of Patent: Aug. 5, 2014

(54) PNEUMATIC TIRE FOR MOTORCYCLE

(75) Inventor: Takaki Hayashi, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 13/513,321

(22) PCT Filed: Dec. 2, 2010

(86) PCT No.: PCT/JP2010/071612
§ 371 (c)(1),
(2), (4) Date: Jun. 1, 2012

(87) PCT Pub. No.: WO2011/068173
PCT Pub. Date: Jun. 9, 2011

(65) Prior Publication Data
US 2012/0241060 A1  Sep. 27, 2012

(30) Foreign Application Priority Data
Dec. 4, 2009  (JP) .................................. 2009-276031

(51) Int. Cl.
*B60C 11/00* (2006.01)
*B60C 11/03* (2006.01)
*B60C 11/117* (2006.01)

(52) U.S. Cl.
USPC ............. 152/209.11; 152/209.25; 152/209.22

(58) Field of Classification Search
CPC ................ B60C 2011/0369; B60C 2011/0379
USPC ............................ 152/209.11, 209.22, 209.25
See application file for complete search history.

(56) References Cited

U.S. PATENT DOCUMENTS 5,358,020 A  10/1994  Haas
8,011,403 B2  9/2011  Nakagawa
2005/0098250 A1  5/2005  Ito
2009/0255615 A1 *  10/2009  Ishiyama et al. ......... 152/209.11

FOREIGN PATENT DOCUMENTS

| CN | 1616261 A | 5/2005 |
| EP | 0561326 A1 | 9/1993 |
| EP | 1 826 026 A1 | 8/2007 |
| EP | 1 641 637 B1 | 4/2010 |

(Continued)

OTHER PUBLICATIONS

Machine Translation: JP 2552401 B2; Suzuki, S; No date.*

(Continued)

*Primary Examiner* — Richard Crispino
*Assistant Examiner* — Kendra Shin
(74) *Attorney, Agent, or Firm* — Sughrue Mion, PLLC

(57) ABSTRACT

Provided is a pneumatic tire for motorcycle in which the abrasion resistance and the steering stability of the tire at the time when the motorcycle is travelling while leaning sideways are combined by resolving the above-mentioned problems and improving the tread pattern.

Provided is a pneumatic tire for motorcycle including a tread portion 11, a pair of sidewall portions 12connected to both sides of the tread portion and a pair of bead portions 13individually connected to the sidewall portions. The tire tread portion has a tread pattern having a plurality of transverse grooves 1to 9. When quarter of the tread width from the tire center portion C is set as a tire middle portion M, a transverse groove arranged stretching across the tire middle portion M of the transverse grooves in the transverse grooves is formed such that the groove depth of the transverse groove varies in the tire width direction and is the deepest at the tire middle portion, and a part of the transverse groove has a disconnected portion 10between the tire center portion C and one tread end TE.

4 Claims, 2 Drawing Sheets

(56) References Cited

FOREIGN PATENT DOCUMENTS

| | | | |
|---|---|---|---|
| GB | 2114069 A | 8/1983 | |
| JP | 61-085203 A | 4/1986 | |
| JP | 2552401 B2 * | 11/1996 | .............. B60C 11/04 |
| JP | 09-039516 A | 2/1997 | |
| JP | 11-291716 A | 10/1999 | |
| JP | 2007-506590 A | 3/2007 | |
| JP | 2007-290538 A | 11/2007 | |
| WO | 2009/013961 A1 | 1/2009 | |
| WO | WO 2010073280 A1 * | 7/2010 | .............. B60C 11/03 |

OTHER PUBLICATIONS

International Search Report for PCT/JP2010/071612 dated Jan. 18, 2011.
Partial Chinese Office Action mailed Apr. 2, 2014 issued in a corresponding Chinese Application No. 201080054722.5.
Supplementary European Search Report issued May 14, 2014 in a corresponding European Application No. 10834623.0.

* cited by examiner

PNEUMATIC TIRE FOR MOTORCYCLE

TECHNICAL FIELD

The present invention relates to a pneumatic tire for motorcycle (hereinafter, also simply referred to as "tire"), and particularly to a pneumatic tire for motorcycle for improving a tread pattern.

TECHNICAL FIELD

Generally, on the contact surface of a tire, when a motorcycle is travelling while leaning sideways, dragging on the surface of a tire occurs due to difference in tire diameters. For this reason, when the motorcycle is travelling while leaning sideways, due to the effect of the dragging, abrasion of the tire is accelerated compared with the case when the motorcycle is travelling straight. Conventionally, in order to control abrasion of the tire when the motorcycle is travelling while leaning sideways, measures have been taken such as (1) a measure in which groove depth of the tire tread portion is made deep uniformly from the tire center portion to the portion frequently used when the motorcycle is travelling while leaning sideways, and (2) a measure in which in the tire tread portion, a part of groove which is frequently used when the motorcycle is travelling while leaning sideways is removed.

As a technique for improving the cornering performance of motorcycle, for example, in Patent Document 1, disclosed is a pneumatic radial tire for a motorcycle in which a belt composed of high elasticity cords arrayed in spiral slightly inclined with respect to the center circumference line of the tread is stretched in 0.5 to 1.1 times the tread width in a spirally-wound-array in which 1 to several cords are arranged in parallel crossing each other and sandwiching the center circumference line of the tread.

In Patent Document 2, disclosed is a pneumatic tire for motorcycle comprising a tread pattern on which a center groove and a side groove are formed on a tread rubber of a tread portion, wherein the center groove has a length which is 50% of the length of the circumference length of the tread; and at the same time and the groove depth is in a range of 70 to 90% of the thickness of the tread rubber which is viewed as a smooth extension of a tread where the groove is positioned; the groove width is in a range of 1 to 5% of the tread width of the arc length; in the tire cross-section of a tire which is installed on an adaptable rim, with respect to a circular arc at the bottom of a groove smoothly linking the groove bottom of the center groove and the groove bottom of the outermost side groove portion in the above-mentioned side groove by another circular arc having its center on the tire equatorial plane, the groove bottom of a near-center side groove positioned at, of the whole area of the tread, at least tread area from the intermediate position between the center of the tread width and the tread end edge to the center groove is positioned in the tread side from the above-mentioned circular arc of the groove bottom; and the ratio of the distance between the groove bottom of the near-center side groove and the circular arc of the groove bottom (d) to the depth of the side groove (D) (d/D) is in the range of 0.1 to 0.5.

RELATED ART DOCUMENTS

Patent Documents

Patent Document 1: Japanese Unexamined Patent Application Publication S61-85203 (claims or the like)

Patent Document 2: Japanese Unexamined Patent Application Publication H09-039516 (claims or the like)

SUMMARY OF THE INVENTION

Problems to be Solved by the Invention

However, the depth of the groove of the tire and whether there is a groove or not are factors which have considerably great contribution not only to the abrasion resistance but also to the steering stability. For this reason, it is difficult to set the groove depth and the groove arrangement for combining the abrasion resistance and the steering stability, and therefore, there has not been such a technique.

Accordingly, an object of the present invention is to provide a pneumatic tire for motorcycle in which the abrasion resistance and the steering stability of the tire at the time when the motorcycle is travelling while leaning sideways are combined by resolving the above-mentioned problems and improving the tread pattern.

Means for Solving the Problems

The present inventor intensively studied the depth and arrangement of the groove of tire tread portion to find the followings. First, as for the depth of the groove, the steering stability and the abrasion resistance can be combined by making the groove shallow for putting a significance on the steering stability and by making the groove deep on the portion which is frequently used when the motorcycle is travelling while leaning sideways where the abrasion resistance is desired to be improved.

The steering stability is largely influenced also by the arrangement of the groove. When grooves on the whole tire is reduced in order to improve the abrasion resistance of the tire when the motorcycle is travelling while leaning sideways, a required steering stability is hard to be secured. Accordingly, by removing grooves only on the portion where the abrasion resistance is desired to be improved, the influence on the steering stability can be minimized and at the same time the abrasion resistance can be improved, whereby the combination of the two performances can be attained.

In view of the above, the present inventor found that, by using two constitutions of the above-mentioned groove depth and the groove arrangement, the steering stability and the abrasion resistance of a pneumatic tire for motorcycles can be highly combined, thereby completing the present invention.

That is, the pneumatic tire for motorcycle of the present invention is a pneumatic tire for motorcycle including a tread portion, a pair of sidewall portions connected to both sides of the tread portion and a pair of bead portions individually connected to the pair of sidewall portions, wherein the tire tread portion has a tread pattern having a plurality of transverse grooves, wherein, when quarter of the tread width from the tire center portion is set as a tire middle portion, a transverse groove arranged stretching across the tire middle portion of the transverse grooves in the transverse grooves is formed such that the groove depth of the transverse groove varies in the tire width direction and is the deepest at the tire middle portion, and a part of the transverse groove has a disconnected portion between the tire center portion and one tread end.

In the present invention, a transverse groove whose groove depth is the deepest at the tire middle portion and having the disconnected portion, and a transverse groove whose groove depth is the deepest at the tire middle portion and not having the disconnected portion are preferably periodically arranged. The disconnected portion of the transverse groove suitably exits at the tire middle portion. Further, the number of transverse grooves having the disconnected portion is preferably less than that of transverse grooves not having the disconnected portion. Still further, the length of the disconnected portion is suitably 5 to 20 mm along the transverse groove having a disconnected portion.

Effects of the Invention

In the present invention, by using a tread pattern having the above-mentioned prescribed groove depth variation and groove arrangement, the steering stability is secured, and at the same time, the abrasion of the tire when the motorcycle is travelling while leaning sideways is restrained, to thereby obtain a pneumatic tire for motorcycle which is devised to have a long life compared with a conventional tire.

MODES FOR CARRYING OUT THE INVENTION

Figure 1:
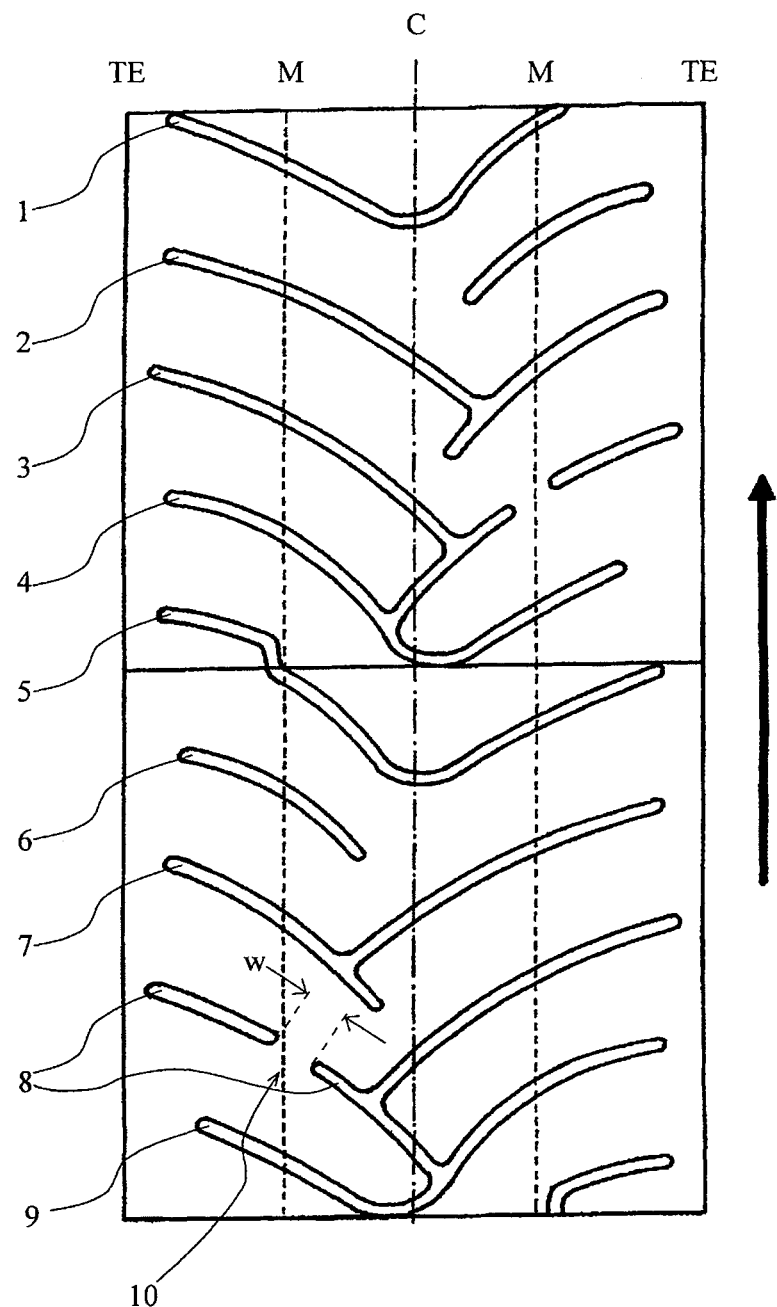
FIG. 1 is a partly developed view of a tread portion illustrating a tread pattern of a pneumatic tire for motorcycle of the present invention.

In the following, modes for carrying out the present invention will be described in detail referring to the drawings.

Figure 2:
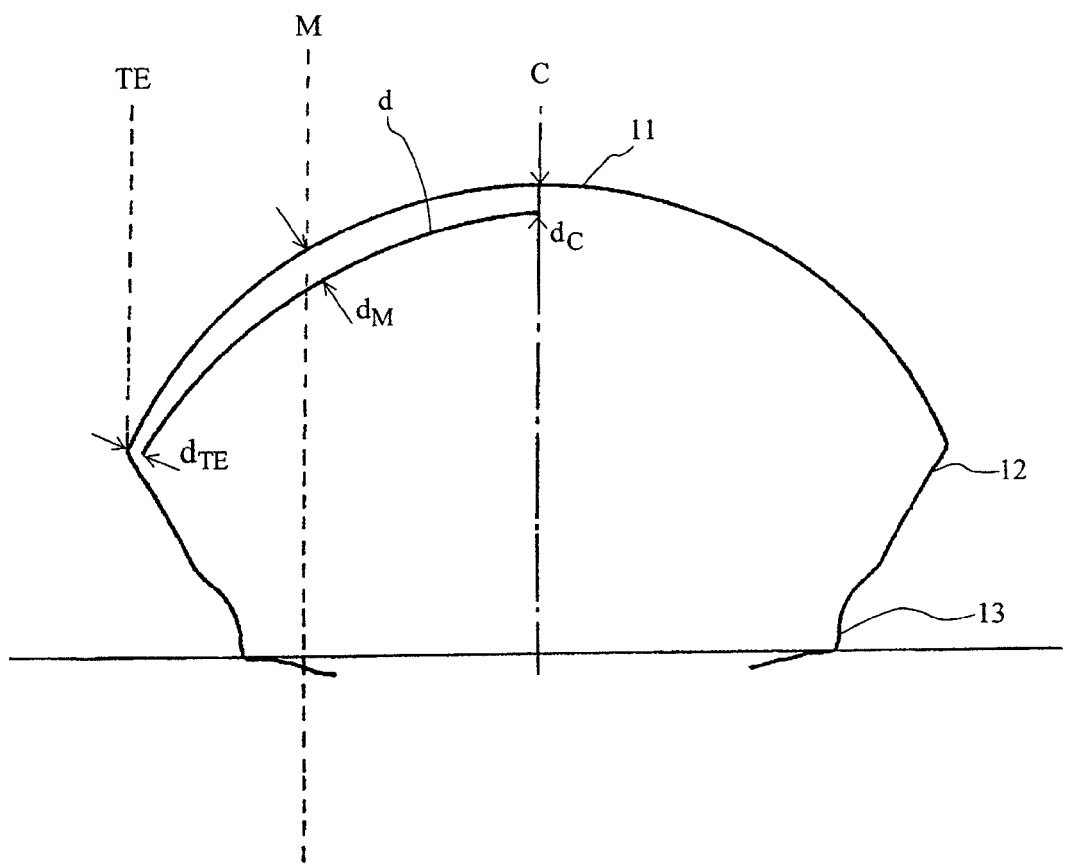
FIG. 2 is an explanatory view illustrating the external shape of a pneumatic tire for motorcycle of the present invention.

FIG. 1 is a partly developed view of a tread portion illustrating a tread pattern of a pneumatic tire for motorcycle of the present invention. FIG. 2 is an explanatory view illustrating the external shape of a pneumatic tire for motorcycle of the present invention. As shown in FIG. 2, a pneumatic tire for motorcycle of the present invention include a tread portion 11, a pair of sidewall portions 12 connected to both sides of the tread portion and a pair of bead portions 13 individually connected to the pair of sidewall portions 12.

As shown in FIG. 1, in the tire of the present invention, the tire tread portion includes a polarity tread pattern having a plurality of transverse grooves. The arrow in the figure represents the direction of rotation of the tire. In the illustrated example, patterns symmetrical with respect to the line of the tire center portion are offset on both sides in the width direction in the circumferential direction and are combined to form a roughly V-shaped pattern as the whole tread portion. In the illustrated pattern, since transverse grooves having a shape symmetrical with respect to a line on both sides in the width direction are arranged being offset, the present invention will be described below for transverse grooves 1 to 9 on one side in the tire width direction.

In the present invention, when quarter of the tread width from the tire center portion C is set as a tire middle portion M, a transverse groove arranged stretching across the tire middle portion M of the transverse grooves 1 to 9, in the illustrated example all the transverse grooves 1 to 9, in the transverse grooves is formed such that the groove depth of the transverse groove varies in the tire width direction and is the deepest at the tire middle portion. That is, as schematically illustrated in FIG. 2, the depth d of the transverse groove arranged stretching across tire middle portion M is the deepest, and when the groove depth at the tire center portion C is set to $d_C$, the groove depth at tire middle portion M is set to $d_M$ and the groove depth at the tread end TE is set to $d_{TE}$, $d_M > d_C$ and $d_M > d_{TE}$ are satisfied. In the present invention, as described above, in the tire center portion which contributes to the steering stability, the groove depth is made shallow, and in the tire middle portion which is frequently used when the motorcycle is travelling while leaning sideways, the groove depth is made deep, whereby the steering stability can be secured and at the same time, the abrasion resistance can be improved. In the present invention, the term "tread width" means the width direction length along the tire surface of the tire tread portion.

Figure 3:
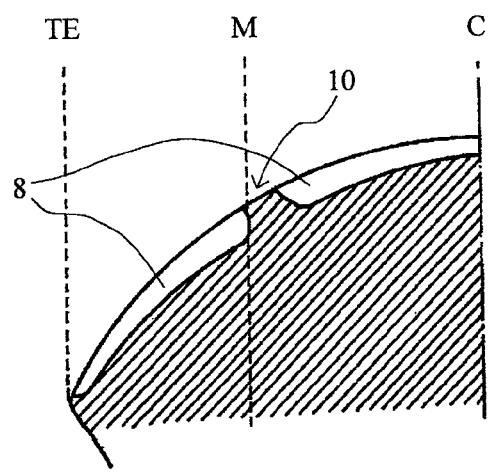
FIG. 3 is a schematic cross-sectional view illustrating a transverse groove having a disconnected portion.

In the present invention, a part of the transverse groove, in the illustrated example, a transverse groove 8 has a disconnected portion 10 between the tire center portion C and one side of the tread end TE. By making not all of the transverse grooves but only a part of the transverse grooves have a disconnected portion, the abrasion resistance can be further improved without compromising the steering stability. Accordingly, in the present invention, by employing a tread pattern in which conditions of the above-mentioned groove depth and groove arrangement of the transverse grooves are combined, a high performance pneumatic tire for motorcycle in which the steering stability and the abrasion resistance of the tire as a whole are highly combined can be obtained. In the present invention, also for the transverse groove 8 having the disconnected portion 10, when the groove is arranged stretching across the tire middle portion M, the groove depth is set to be the deepest at the tire middle portion M. That is, as shown in the schematic cross-sectional view in FIG. 3, the groove depth of the transverse groove 8 is formed such that the depth becomes deeper toward the tire middle portion M irrespective of the arranged position of the disconnected portion 10.

In the present invention, when the groove depth of the above-mentioned transverse groove is set to be the deepest at the tire middle portion M, an expected effect is obtained, and specifically, the groove depth $d_M$ of the above-mentioned transverse groove at the tire middle portion M may be about 1.03 to 1.10 times the groove depth $d_C$ at the tire center portion C. When the difference between the groove depth $d_M$ of the above-mentioned transverse groove at the tire middle portion M and the groove depth at the tire center portion C is too small, the effect of the present invention becomes small, and on the other hand, when the difference is too large, the balance between the steering stability and the abrasion resistance may deteriorate, any of the above cases are not preferable. More specifically, although also depending on the tire size, for example, the groove depth $d_C$ at tire center portion C may be 4.5 to 4.7 mm, the groove depth $d_M$ at tire middle portion M may be 4.7 to 5.0 mm and the groove depth $d_{TE}$ at the tread end TE may be 2.0 to 3.5 mm.

In the present invention, the disconnected portion 10 of the above-mentioned transverse groove is, as suitably illustrated, present at the tire middle portion M. When the motorcycle is travelling while leaning sideways, since the tire middle portion M is particularly frequently used, it is effective for improving the abrasion resistance to provide a disconnected portion in the transverse groove at the tire middle portion M. The length w of the disconnected portion 10 may be, for example, 5 to 20 mm along the transverse groove having a disconnected portion. When the length w of the disconnected portion 10 is too short, the effect of improving the abrasion resistance becomes small, and on the other hand, the length is too long, the steering stability may be compromised, any of the above cases are not preferable.

Further, in the present invention, the number of the transverse grooves having the above-mentioned disconnected portion is preferably less than that of the transverse grooves not having the disconnected portion. In other words, a less number of the transverse grooves not having the disconnected portion of the transverse grooves are arranged than the number of transverse grooves continuously arranged stretching across the tire middle portion M. When the number of the transverse grooves having a disconnected portion are too large, the roll properties deteriorate, which is not preferable. Specifically, it is preferable, from the viewpoint of combining the roll properties and the abrasion resistance, that, for example, the ratio of transverse grooves having the disconnected portion to the all transverse grooves be 5 to 20% and particularly 5 to 15%. That is, [(the number of transverse grooves having a disconnected portion)/(the number of all transverse grooves)]×100 is suitably 5 to 20% (particularly, 5 to 15%).

Still further, in the present invention, preferably, the groove depth is the deepest at the tire middle portion M, and the transverse groove 8 having a disconnected portion 10, the groove depth is the deepest at the tire middle portion M, and transverse grooves not having a disconnected portion 1 to 7, 9 are periodically arranged. By this, a moderate ground feel and stiffness when the motorcycle is travelling while leaning sideways can be attained. The pitch of the plurality of transverse grooves arranged in the tire circumferential direction is not particularly restricted, and may be, for example, about ⅕₀ to ¼₀ of the total circumference length of the tire.

In the present invention, any tires in which the tire tread portion includes a tread pattern having a plurality of transverse groove can be applied. The pattern is not limited to, as illustrated, a pattern including a transverse groove 1 extending in the vicinity of both tread end TE and continuing across the tire center portion C, or transverse grooves 2, 7 connected to each other to form a branched groove portion, and may be a pattern which is formed only by transverse groove 6 singly arranged stretching across or not stretching across tire center portion C.

In the tire of the present invention, it is important only to satisfy the conditions of the above-mentioned tread pattern. By this, an expected effect of the present invention can be obtained, and the other details such as tire structure and materials of each member of the tire are not particularly restricted. For example, although not illustrated, the tire of the present invention includes a carcass arranged bridging bead cores individually embedded in a pair of bead portion and reinforcing each portion, and a belt arranged on the circumference of this carcass and reinforcing a tread portion.

EXAMPLES

In the following, the present invention will be described in detail by way of Examples.

Example 1

Using a tire size of 120/70ZR17M/C, a pneumatic tire for motorcycle of Example 1 having a tread pattern represented in FIG. 1 was manufactured. In transverse grooves included in this tread pattern, transverse grooves arranged stretching across the tire middle portion M was formed such that the groove depth varied in the tire width direction, and was the deepest at the tire middle portion M. For each transverse groove, the groove depth $d_C$ at the tire center portion C was 4.5 mm, the groove depth $d_M$ at the tire middle portion M was 4.7 mm and the groove depth $d_{TE}$ at the tread end TE was 2.5 mm. The length w of the disconnected portion of the transverse groove was 13 mm along the transverse groove.

Comparative Example 1

A pneumatic tire for motorcycle of Comparative Example 1 was manufactured in the same manner as in Example 1 except that all the groove depths of transverse grooves contained in the tread pattern were uniform, and that all the transverse grooves contained in the tread pattern were formed continuously not having a disconnected portion. The groove depth for each transverse groove was 4.5 mm.

Comparative Example 2

A pneumatic tire for motorcycle of Comparative Example 2 was manufactured in the same manner as in Comparative Example 1 except that the groove depth of each transverse groove contained in the tread pattern was uniformly 4.7 mm.

<Comparative Test for Abrasion Resistance at Tire Middle Portion When the Motorcycle is Travelling While Leaning Sideways>

For each test tire obtained in Example 1 and Comparative Example 1, travelling conditions in general market were reproduced to perform a comparative test for the abrasion resistance. Each test tire was installed on a 1250 cc motorcycle, and the motorcycle was ridden by a test rider on a course which has a distance ratio expressway:urban area: mountainous area (mountain ridge) of about 15:10:75 (%). The evaluation was performed by comparing the groove depth of the transverse groove at the tire middle portion M of a new tire with the groove depth thereof after travelling about 2650 km. As the result, when the abrasion loss of the test tire of Comparative Example 1 was set to 100%, the abrasion loss of test tire of Example 1 was 105%, and it was confirmed that the abrasion life at the tire middle portion M in Example 1 improved by 5%. For the test tire in Comparative Example 2, the same test was performed to favorably obtain the same abrasion resistance as in Example 1.

<Comparative Test of Steering Stability>

Each test tire obtained in Example 1 and Comparative Example 2 was installed on a 1250 cc motorcycle to perform a sensory evaluation of the steering stability by a test rider. As the result, in the test tire in Comparative Example 2 in which the groove depth was uniform and as deep as 4.7 mm, output of the tire near upright was small, and convergence to straight movement disturbance was low. Initial cornering ability when entering a corner was low, and appearance of the cornering ability in accordance with the change of the camber angle was felt unlinear, and the cornering characteristics was poor. On the other hand, the groove depth varied in tire width direction, and in the test tire of Example 1 in which the depth was set to be the deepest at the tire middle portion M, convergence to straight movement disturbance was high compared with the test tire of Comparative Example 2, and initial cornering ability when entering a corner was favorable compared with Comparative Example 2, and further, the appearance of the cornering ability was improved to be felt linear. As the result, it was confirmed that the test tire of Example 1 was improved in the steering stability compared with the test tire of Comparative Example 2. For the test tire of Comparative Example 1, the same test was performed to favorably obtain the same steering stability as in Example 1.

By the above-mentioned test results, in the test tire of Example 1 satisfying the requirements of the present invention for the groove depth and the groove arrangement of the transverse groove, it was confirmed that favorable steering stability and abrasion resistance were combined.

Description of Symbols

1 to 9 Transverse Groove
10 Disconnected Portion
11 Tread Portion
12 Sidewall Portion
13 Bead Portion

The invention claimed is:

1. A pneumatic tire for motorcycle including a tread portion, a pair of sidewall portions connected to both sides of the tread portion and a pair of bead portions individually connected to the pair of sidewall portions,
wherein the tire tread portion has a tread pattern having plural kinds of transverse grooves (1-9), wherein, when quarter of the tread width from the tire center portion is set as a tire middle portion M, transverse grooves (1-7, 9) of said plural kind of transverse grooves (1-9) arranged stretching across the tire middle portion M are formed such that the groove depth of the transverse grooves (1-7, 9) varies in the tire width direction and is the deepest at the tire middle portion M, so that when the groove depth at the Center portion C is set to dc, the groove depth at the middle portion M is set to $d_M$ and groove depth at the tread end TE is set to $d_{TE}$, $d_M$>dc and $d_M$>$d_{TE}$ are satisfied and another transverse groove (8) of said plural kind of transverse grooves (1-9) having a disconnected portion on the tire middle portion M is formed,
wherein said disconnected portion extends to the tread surface and separates one groove part of said another transverse groove (8) and another groove part of said another transverse groove (8), each of said one groove part and another groove part having a depth becoming deeper toward said disconnected portion.

2. The pneumatic tire for motorcycle according to claim 1, wherein the another transverse groove (8) having the disconnected portion and the transverse grooves (1-7, 9) arranged stretching across the tire middle portion M whose groove depth is the deepest at the tire middle portion M are periodically arranged.

3. The pneumatic tire for motorcycle according to claim 1, wherein the number of the another transverse grooves (8) having the disconnected portion is less than that of the transverse grooves not having the disconnected portion.

4. The pneumatic tire for motorcycle according to claim 1, wherein the length of the disconnected portion is 5 to 20 mm along the transverse groove having a disconnected portion.

* * * * *